US012671898B2

(12) United States Patent　(10) Patent No.: US 12,671,898 B2
Toda　(45) Date of Patent: Jun. 30, 2026

(54) INFORMATION PROCESSING DEVICE, INFORMATION PROCESSING METHOD, AND PROGRAM

(71) Applicant: Sony Group Corporation, Tokyo (JP)

(72) Inventor: Shinsuke Toda, Saitama (JP)

(73) Assignee: Sony Group Corporation, Tokyo (JP)

( * ) Notice: Subject to any disclaimer, the term of this patent is extended or adjusted under 35 U.S.C. 154(b) by 153 days.

(21) Appl. No.: 18/714,449

(22) PCT Filed: Nov. 25, 2022

(86) PCT No.: PCT/JP2022/043456
§ 371 (c)(1),
(2) Date: May 29, 2024

(87) PCT Pub. No.: WO2023/106118
PCT Pub. Date: Jun. 15, 2023

(65) Prior Publication Data
US 2025/0024145 A1　Jan. 16, 2025

(30) Foreign Application Priority Data

Dec. 9, 2021　(JP) ................................. 2021-200038

(51) Int. Cl.
G06T 7/70　(2017.01)
G06T 5/70　(2024.01)
(Continued)

(52) U.S. Cl.
CPC ............. H04N 23/671 (2023.01); G06T 5/70 (2024.01); G06T 7/20 (2013.01); G06T 7/521 (2017.01);
(Continued)

(58) Field of Classification Search
CPC .... H04N 23/671; H04N 23/61; H04N 23/667; H04N 23/67; H04N 23/60; G06T 5/70;
(Continued)

(56) References Cited

U.S. PATENT DOCUMENTS 10,783,559 B1 *　9/2020　Tran ......................... H04W 4/40
12,008,778 B2 *　6/2024　Kasuya ................ G05D 1/0274
(Continued)

FOREIGN PATENT DOCUMENTS

JP　　H09005611 A　　1/1997
JP　　2002165126 A　　6/2002
(Continued)

OTHER PUBLICATIONS

International Search Report (PCT/ISA/210), International Application No. PCT/JP2022/043456, dated Dec. 20, 2022.

*Primary Examiner* — Howard D Brown, Jr.
(74) *Attorney, Agent, or Firm* — Michael Best & Friedrich LLP

(57) ABSTRACT

Information processing devices, methods, and programs that enable an appropriate subject to be a predetermined processing target are disclosed. In one example, an information processing device includes a processing target determination unit that determines a processing target in predetermined processing on an input image, using processing target determination Depth information selected from first Depth information indicating a distance to a subject included in the input image, the first Depth information being based on an output of a distance sensor, and second Depth information based on an output when the input image is input to an inference model that infers the distance to the subject.

19 Claims, 12 Drawing Sheets

(51) Int. Cl.

| | | |
|---|---|---|
| *G06T 7/20* | (2017.01) | |
| *G06T 7/521* | (2017.01) | |
| *H04N 23/61* | (2023.01) | |
| *H04N 23/667* | (2023.01) | |
| *H04N 23/67* | (2023.01) | |

(52) U.S. Cl.
CPC .......... *H04N 23/61* (2023.01); *H04N 23/667* (2023.01); *G06T 2207/20081* (2013.01)

(58) Field of Classification Search
CPC . G06T 7/20; G06T 7/521; G06T 2207/20081; G03B 13/36; G03B 15/00
See application file for complete search history.

(56) References Cited

U.S. PATENT DOCUMENTS

| | | | | |
|---|---|---|---|---|
| 2007/0237514 A1 * | 10/2007 | Pillman | .............. | H04N 23/6811 |
| | | | | 396/153 |
| 2017/0158197 A1 * | 6/2017 | Johnson | .............. | B60W 30/095 |
| 2020/0334843 A1 * | 10/2020 | Kasuya | ................... | G01S 17/86 |
| 2021/0233115 A1 * | 7/2021 | Kardesler | ........... | G06N 3/0442 |
| 2022/0237921 A1 * | 7/2022 | Horigome | ............ | G01S 13/931 |
| 2022/0237922 A1 * | 7/2022 | Horigome | .............. | B60R 11/04 |
| 2023/0396876 A1 * | 12/2023 | Yaguchi | .............. | H04N 23/687 |

FOREIGN PATENT DOCUMENTS

| | | |
|---|---|---|
| JP | 2016059051 A | 4/2016 |
| JP | 2019124537 A | 7/2019 |
| JP | 2019159914 A | 9/2019 |
| WO | 2020059565 A1 | 3/2020 |

* cited by examiner

Figure 9:
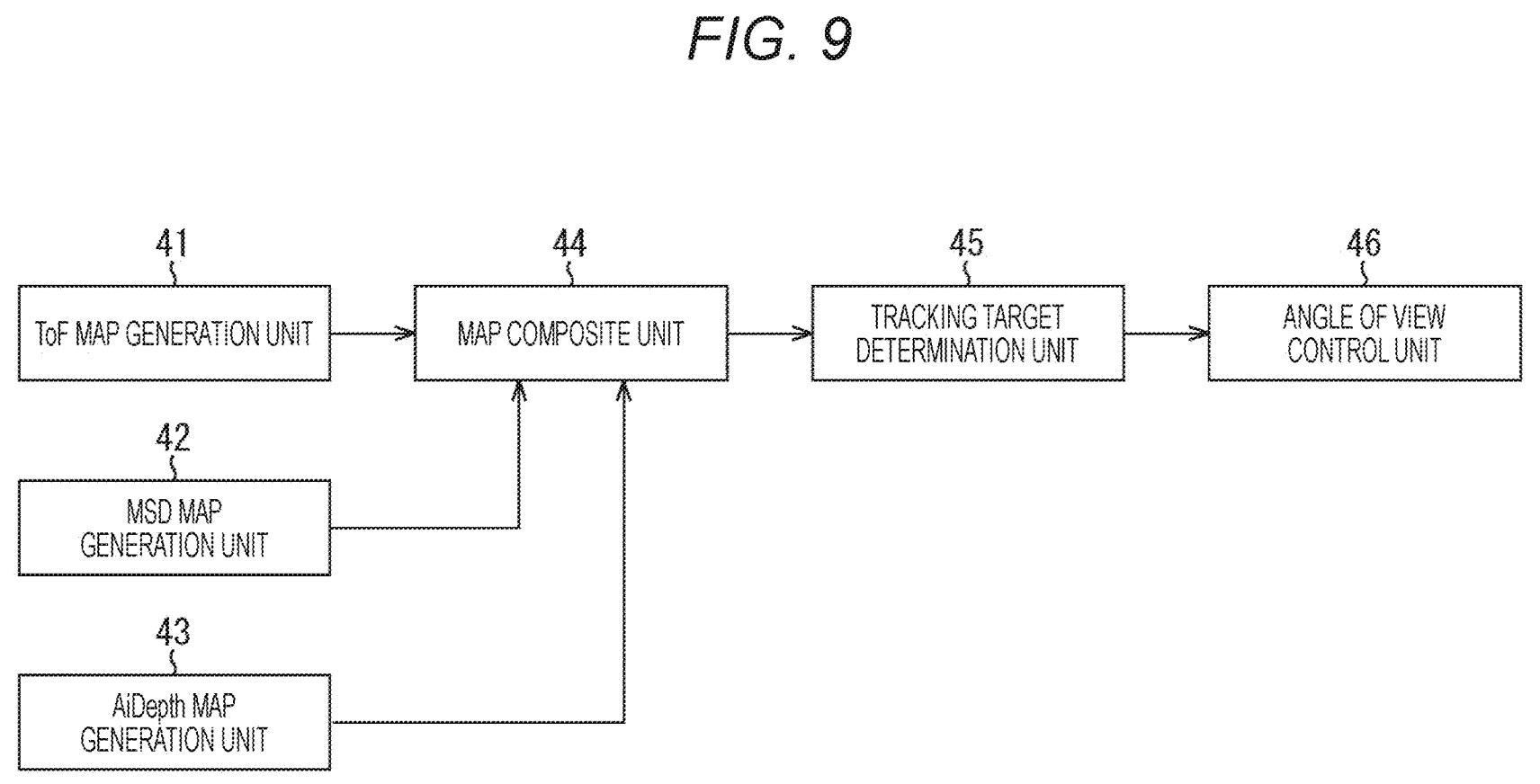

```
41  ToF MAP GENERATION UNIT ─────┐
                                  │
                                  ▼
44                       MAP COMPOSITE UNIT ──────▶ 45  TRACKING TARGET
42  MSD MAP                      ▲  ▲               DETERMINATION UNIT ──────▶ 46  ANGLE OF VIEW
    GENERATION UNIT ─────────────┘  │                                            CONTROL UNIT
                                    │
43  AIDepth MAP                     │
    GENERATION UNIT ────────────────┘
```

INFORMATION PROCESSING DEVICE, INFORMATION PROCESSING METHOD, AND PROGRAM

TECHNICAL FIELD

The present technology relates to an information processing device, an information processing method, and a program, and more particularly, to an information processing device, an information processing method, and a program that enable an appropriate subject to be subject to predetermined processing.

BACKGROUND ART

A device having an imaging function such as a digital still camera or a smartphone is usually equipped with an autofocus function (Patent Document 1).

CITATION LIST

Patent Document

Patent Document 1: Japanese Patent Application Laid-Open No. 2002-165126

SUMMARY OF THE INVENTION

Problems to be Solved by the Invention

In this technical field, further improvement in performance is desired in order to focus on an appropriate subject.

The present technology has been made in view of such a situation, and enables an appropriate subject to be subject to predetermined processing.

Solutions to Problems

An information processing device according to one aspect of the present technology includes a processing target determination unit that determines a processing target in predetermined processing on an input image, using processing target determination Depth information selected from first Depth information indicating a distance to a subject included in the input image, the first Depth information being based on an output of a distance sensor, and second Depth information based on an output when the input image is input to an inference model that infers the distance to the subject.

In one aspect of the present technology, a processing target in predetermined processing on an input image is determined, using processing target determination Depth information selected from first Depth information indicating a distance to a subject included in the input image, the first Depth information being based on an output of a distance sensor, and second Depth information based on an output when the input image is input to an inference model that infers the distance to the subject.

BRIEF DESCRIPTION OF DRAWINGS

FIG. 1 is a diagram illustrating an example of focus target determination processing.

FIG. 6 is a diagram illustrating a first modification of the focus target determination processing.

FIG. 9 is a block diagram illustrating a functional configuration example of a control unit in a case where the present technology is applied to tracking control processing.

MODE FOR CARRYING OUT THE INVENTION

Figure 2:
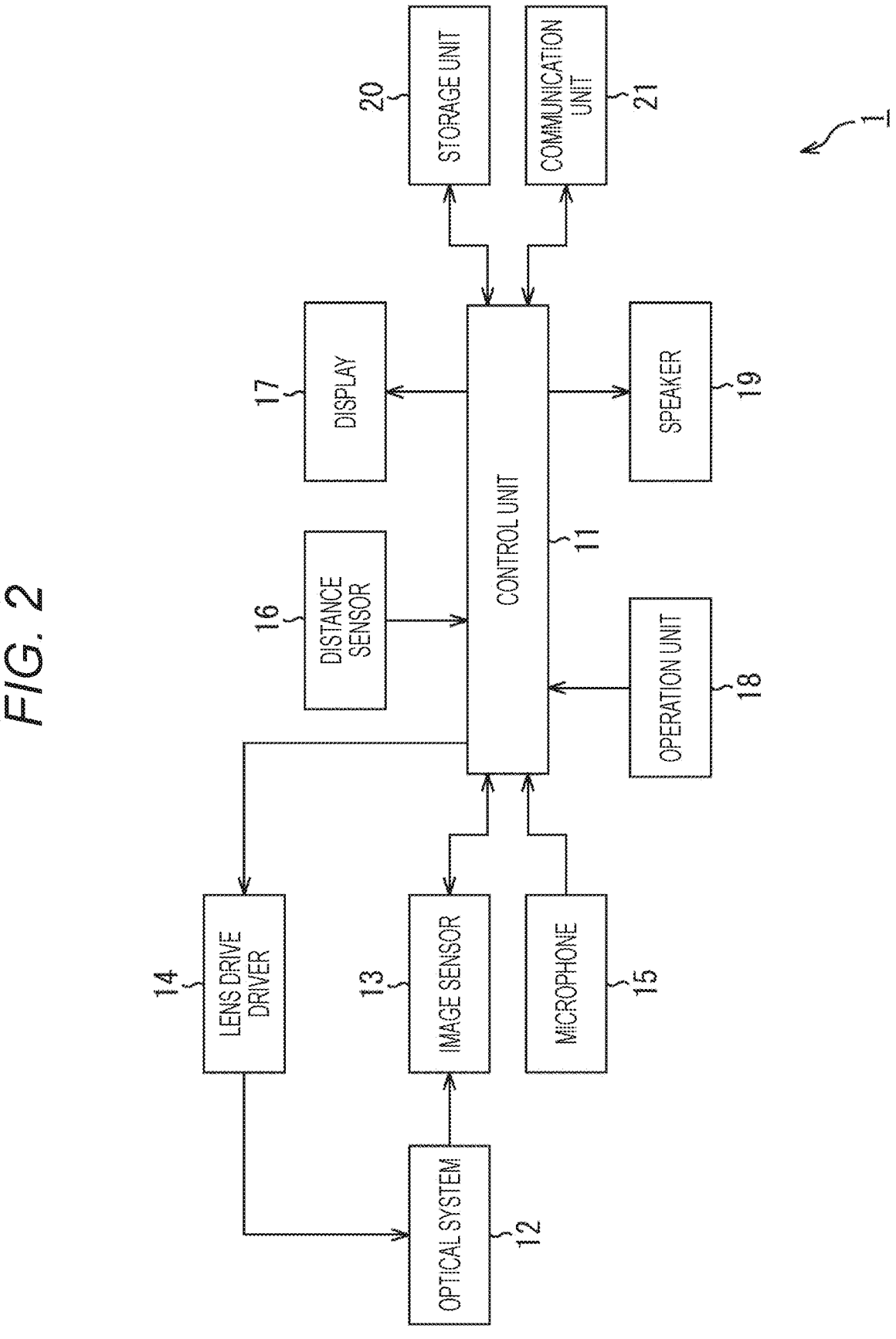
FIG. 2 is a block diagram illustrating a hardware configuration example of an imaging device.

Modes for carrying out the present technology will be described below. The description will be given in the following order.

1. Focus target determination processing
2. Configuration of imaging device
3. Selection of processing target determination Depth information
4. Operation of imaging device
5. First modification of focus target determination processing
6. Second modification of focus target determination processing
7. Third modification of focus target determination processing
8. Tracking target determination processing
9. Emphasis target determination processing
10. Others
11. Examples of combinations of configurations <1. Focus Target Determination Processing>

Figure 1:
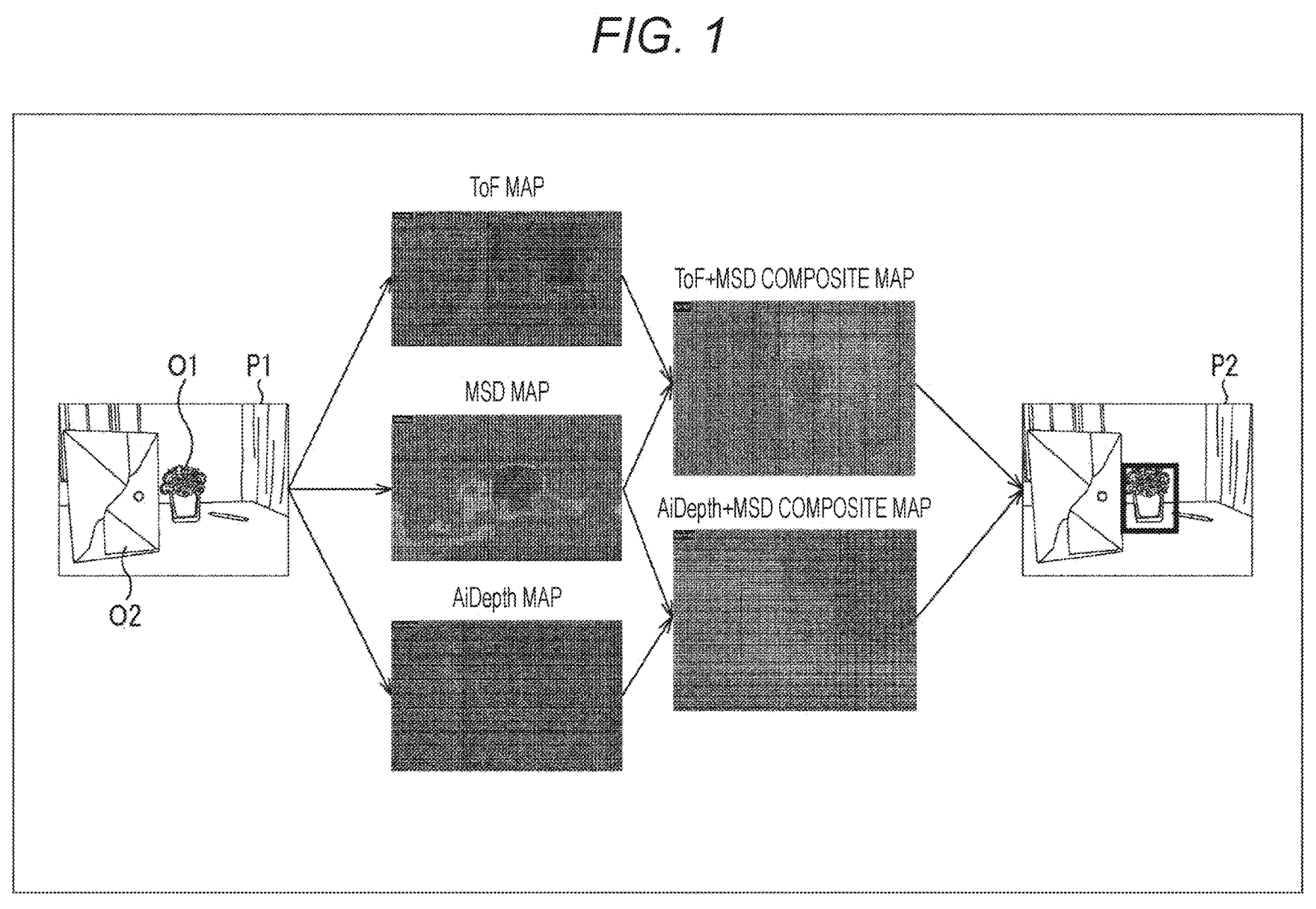

FIG. 1 is a diagram illustrating an example of focus target determination processing in an imaging device according to an embodiment of the present technology.

An imaging device according to an embodiment of the present technology is a device having an imaging function, such as a smartphone, a digital still camera, or a monitoring camera. The imaging device has an autofocus function.

Autofocus in the imaging device is performed by appropriately determining a focus target, which is a subject to be focused, from among subjects included in an input image using an input image or the like without performing phase difference detection. Imaging is performed in a state of focusing on the determined focus target.

FIG. 1 illustrates focus target determination processing on an input image P1 including subjects O1 and O2. The subject O1 appearing substantially at a center of the input image P1 is a flower inserted in a vase, and the subject O2 appearing largely on a left side is a box-shaped subject. For example, the subject O2 is on a near side, and the subject O1 is on a deep side of the subject O2. A wall surface is shown behind the subject O1 and the subject O2 placed on a floor surface or the like.

For example, a focus target is determined using a preview image including such subjects as an input image. Note that an input image P1 illustrated at a left end and an input image P2 illustrated at a right end in FIG. 1 are the same image including the same subjects. For convenience of description, different numbers are assigned to the input image P1 and the input image P2.

Here, three maps illustrated in FIG. 1 are generated corresponding to the input image P1.

A first map is a time of flight (ToF) map in which a distance to a subject at a position corresponding to each pixel of the input image P1 measured by a ToF sensor is a value of each pixel.

Shading on the ToF map of FIG. 1 basically indicates a difference in distance to the subject at the position corresponding to each pixel. A lighter color of a pixel indicates a shorter distance to the subject at the position corresponding to the pixel, and a darker color of a pixel indicates a longer distance to the subject at the position corresponding to the pixel. For example, a region of the pixel in which the subject O2 at the front position appears is illustrated in a light color.

A second map is a main subject detection (MSD) map in which a degree of main subject that is a degree of main subject similarity of a subject at a position corresponding to each pixel of the input image P1 is set as a value of each pixel.

The main subject degree is obtained by performing main subject detection (MSD). The main subject detection is performed using, for example, an inference model having the input image P1 as an input and the main subject degree as an output. An inference model for main subject detection generated in advance by machine learning using a plurality of images in which main subject degrees of subjects included in the image are set is prepared in the imaging device.

The shading on the MSD map of FIG. 1 indicates a difference in the main subject degree of the subject at the position corresponding to each pixel. The darker the color of the pixel, the higher the main subject degree of the subject at the position corresponding to the pixel, and the lighter the color of the pixel, the lower the main subject degree of the subject at the position corresponding to the pixel. For example, the region of the pixel in which the subject O1 at the central position appears is illustrated in a light color. In a case where imaging is performed with the subject as illustrated in the input image P1 included in a composition, it is considered that the user pays attention to the subject O1 of the flower at the center.

A third map is an AiDepth map in which the distance to the subject at the position corresponding to each pixel is set as a value of each pixel based on the output when the input image P1 is input to the inference model generated by the machine learning. An inference model for distance inference generated in advance by machine learning using a plurality of images in which the distance to the subject included in the image is set is prepared in the imaging device.

A shade on the AiDepth map in FIG. 1 indicates a difference in distance to the subject at the position corresponding to each pixel. Similarly to the ToF map, a lighter color of the pixel indicates a shorter distance to the subject at the position corresponding to the pixel, and a darker color of the pixel indicates a longer distance to the subject at the position corresponding to the pixel.

As described above, in the imaging device, two pieces of Depth information of the ToF map based on the output of the ToF sensor and the AiDepth map based on the output of the inference model generated by machine learning are generated as the Depth information indicating the distance to the subject.

Subsequently, as illustrated in FIG. 1, a ToF+MSD composite map is generated by composition processing of the ToF map and the MSD map. Furthermore, an AiDepth+MSD composite map is generated by composition processing of the AiDepth map and the MSD map. Each composition processing is performed, for example, by adding pixel values of corresponding pixels of two maps to be composed.

Then, with use of either the ToF+MSD composite map or the AiDepth+MSD composite map, the subject O1 is determined as a focus target as indicated by a thick line on the input image P2. For example, one of the ToF+MSD composite map and the AiDepth+MSD composite map is selected on the basis of the reliability of the AiDepth map, and the focus target is determined using the selected composite map.

Here, in the composite map selected from the ToF+MSD composite map and the AiDepth+MSD composite map, the subject O1 is determined as the focus target because the subject O1 is a subject appearing in a region having a higher value than the subject O2. In the imaging device, focus control for focusing on the subject O1 is performed.

The focus target is determined by algorithm prioritizing a short distance only on the basis of the information on the distance to the subject, and then the subject closest to the imaging device is always determined as the focus target, but the subject closest to the imaging device is not necessarily a most appropriate focus target.

On the other hand, when the focus target is determined using the composite map as illustrated in FIG. 1, the focus target is determined using both the information on the distance to the subject and the information on the main subject degree of the subject. The focus target using both the information on the distance to the subject and the information on the main subject degree of the subject is determined, a more appropriate subject can be determined in consideration of the type, size, position in the image, and the like of the subject as the focus target. Since it is considered that the user pays attention to the subject O1 of the flower at the center, it can be said that setting the subject O1 as the focus target determines a more appropriate subject as the focus target. Note that, as described later, the learning of the inference model used for generating the MSD map is performed in consideration of the type and size of the subject, the position in the image, and the like.

Determining the processing target using any one of the two composite maps corresponds to determining the processing target using any one of the two pieces of Depth information of the ToF map and the AiDepth map while considering the main subject degree.

In the example of FIG. 1, two composite maps are generated, but only a composite map of one map selected from the ToF map and the AiDepth map and the MSD map may be generated. As a result, a processing load can be reduced.

<2. Configuration of Imaging Device>

FIG. 2 is a block diagram illustrating a hardware configuration example of the imaging device 1.

The imaging device 1 includes a control unit 11, an optical system 12, an image sensor 13, a lens drive driver 14, a microphone 15, a distance sensor 16, a display 17, an operation unit 18, a speaker 19, a storage unit 20, and a communication unit 21.

The control unit 11 includes a central processing unit (CPU), a read only memory (ROM), a random access memory (RAM), and the like. The control unit 11 executes a predetermined program and controls the entire operation of the imaging device 1 according to the operation of the user.

The optical system 12 includes an imaging lens for condensing light from a subject on the image sensor 13, a drive mechanism for moving the imaging lens to perform focusing and zooming, a shutter mechanism, an iris mechanism, and the like. They are driven on the basis of the control of the lens drive driver 14. The incident light from the subject reaches the image sensor 13 as an imaging device through the optical system 12.

The image sensor 13 photoelectrically converts incident light from the subject into a charge amount, and outputs the charge amount as image data. The image data output from the image sensor 13 is output to the control unit 11. As the image sensor 13, a charge coupled device (CCD), a complementary metal oxide semiconductor (CMOS), or the like is used. The optical system 12 and the image sensor 13 function as an imaging unit.

The lens drive driver 14 includes, for example, a microcomputer, and controls operations of a driving mechanism, a shutter mechanism, an iris mechanism, and the like of the optical system 12 under the control of the control unit 11. Therefore, an exposure time (shutter speed) is adjusted, an aperture value (F value) is adjusted, and the like.

The microphone 15 outputs audio data such as collected sound to the control unit 11.

The distance sensor 16 includes a sensor capable of detecting a distance in the depth direction to the subject, such as a ToF sensor. The distance sensor 16 measures the distance to the subject included in the input image and outputs sensor data to the control unit 11.

The display 17 includes an LCD or the like, and displays various types of information such as a menu screen and an image being captured under the control of the control unit 11.

The operation unit 18 includes an operation button, a touch panel, or the like provided on a surface of a housing of the imaging device 1. The operation unit 18 outputs information indicating the content of the user's operation to the control unit 11.

The speaker 19 outputs sound on the basis of an audio signal supplied from the control unit 11.

The storage unit 20 includes a flash memory or a memory card inserted into a card slot provided in the housing. The storage unit 20 stores various data such as image data supplied from the control unit 11.

The communication unit 21 performs wireless or wired communication with an external device. The communication unit 21 transmits various data such as image data supplied from the control unit 11 to a computer, a smartphone, or the like.

Figure 3:
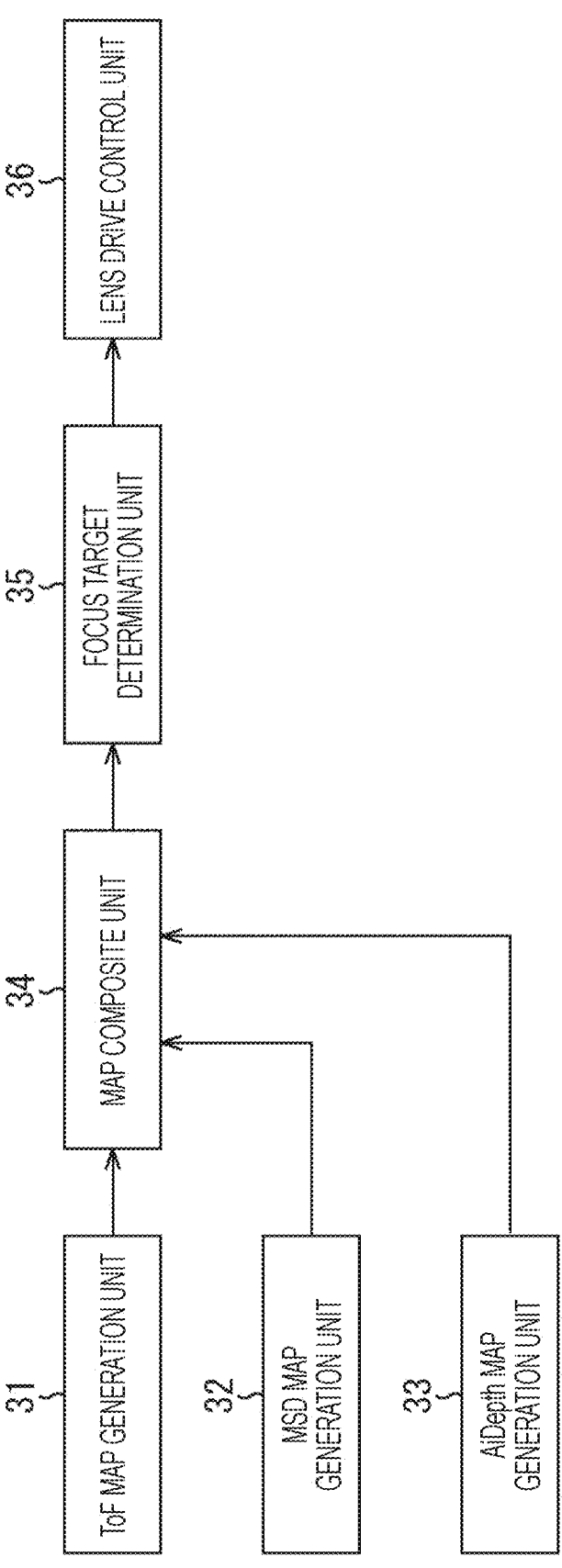
FIG. 3 is a block diagram illustrating a functional configuration example of a control unit in a case where the present technology is applied to autofocus control processing.

FIG. 3 is a block diagram illustrating a functional configuration example of the control unit 11.

As illustrated in FIG. 3, the control unit 11 includes a ToF map generation unit 31, an MSD map generation unit 32, an AiDepth map generation unit 33, a map composition unit 34, a focus target determination unit 35, and a lens drive control unit 36. At least a part of the configuration illustrated in FIG. 3 is realized by executing a predetermined program by the CPU configuring the control unit 11. The sensor data supplied from the ToF sensor configuring the distance sensor 16 is input to the ToF map generation unit 31, and the image data supplied from the image sensor 13 is input to the MSD map generation unit 32 and the AiDepth map generation unit 33.

The ToF map generation unit 31 generates a ToF map on the basis of the output of the ToF sensor. The output of the ToF sensor is sensor data indicating the distance (Depth) to the subject included in the input image. The ToF map is a Depth map in which a distance to the subject at the position corresponding to each pixel of the input image is recorded as a pixel value of each pixel.

The Depth information generated by the ToF map generation unit 31 may be information other than the map-shaped information. For example, instead of information indicating the distances to all subjects included in the input image, information indicating the distances to some subjects may be generated as the Depth information.

Furthermore, the information used by the ToF map generation unit 31 to generate the Depth information is not limited to the output of the ToF sensor, and may be an output of another distance sensor. In a case where the Depth information is generated using the output of another distance sensor, the ToF map generation unit 31 generates the Depth information based on the output of another distance sensor different from the ToF sensor. That is, it can be said that the ToF map generation unit 31 generates Depth information indicating the distance to the subject included in the input image based on the outputs of the various distance sensors.

The ToF map generated by the ToF map generation unit 31 is supplied to the map composition unit 34.

The MSD map generation unit 32 generates an MSD map on the basis of the input image. The MSD map is a map in which a degree of main subject, which is a value indicating a degree of a main subject similarity of the subject at the position corresponding to each pixel of the input image, is set as a pixel value of each pixel.

The main subject degree information generated by the MSD map generation unit 32 may be information other than the map-shaped information. For example, instead of information indicating the main subject degrees of all subjects included in the input image, information indicating the main subject degrees of some subjects may be generated as the main subject degree information.

That is, it can be said that the MSD map generation unit 32 generates main subject degree information indicating the main subject degree of the subject included in the input image.

Such an MSD map may be generated, for example, by a rule base on the basis of a result of image analysis, or may be generated using an inference model acquired by machine learning as described above. In a case where the MSD map is generated using the inference model, for example, machine learning using a plurality of images labeled with information indicating which subject is the main subject as teacher data is performed, whereby the inference model for main subject detection is generated. For example, the MSD map generation unit 32 inputs the input image to the inference model for main subject detection, and generates the MSD map on the basis of the output of the inference model.

The MSD map generated by the MSD map generation unit 32 is supplied to the map composition unit 34.

The AiDepth map generation unit 33 generates an AiDepth map on the basis of the input image. The AiDepth map is a Depth map in which a distance to the subject at the position corresponding to each pixel of the input image is recorded as a pixel value of each pixel. For example, an inference model having an input image captured by the image sensor 13 as an input and a distance to the subject included in the input image as an output is prepared in the AiDepth map generation unit 33. The AiDepth map generation unit 33 inputs the input image captured by the image sensor 13 to the inference model generated by the machine learning, and generates the AiDepth map.

The Depth information generated by the AiDepth map generation unit 33 can be information other than the map-shaped information. For example, instead of information indicating the distances to all subjects included in the input image, information indicating the distances to some subjects may be generated as the Depth information.

That is, it can be said that the AiDepth map generation unit generates the AiDepth information based on the output when the input image is input to the inference model that infers the distance to the subject.

The MSD map generated by the AiDepth map generation unit 33 is supplied to the map composition unit 34.

The map composition unit 34 generates a ToF+MSD composite map by composition processing of the ToF map and the MSD map. Furthermore, the map composition unit 34 generates an AiDepth+MSD composite map by composition processing of the AiDepth map and the MSD map.

The composition processing by the map composition unit 34 is performed so as to generate one composite map from two maps to be composited, for example, by calculating one pixel value from pixel values of corresponding pixels of the two maps to be composited. For example, the pixel values of the corresponding pixels of the two maps to be composited may be added to generate the composite map, or the pixel values of the corresponding pixels of the two maps to be composited may be weighted and then added to generate the composite map. Note that, in a case where the composite map is generated by addition, there is a relationship that the distance to the subject, which is the pixel value of the ToF map and the AiDepth map, is more likely to be appropriate as a focus target as the distance is shorter. Therefore, the pixel value conversion processing may be performed such that the value becomes larger as the distance is shorter, and then the pixel value of the MSD map may be added. For example, the map composition unit 34 may generate the ToF+MSD composite map and the AiDepth+MSD composite map by different composition processing. In this manner, the map composition unit 34 generates composition information that is two composite maps of the ToF+MSD composite map and the AiDepth+MSD composite map.

Similarly, in a case where the two pieces of information to be composited are information other than the map-shaped information, the composition processing is similarly performed. For example, the composition information is generated by simply adding a value indicated by information corresponding to the Depth information and the main subject degree information or performing weighted addition. For example, the distance and the main subject degree for the same subject are values indicated by the corresponding Depth information and main subject degree information.

The ToF+MSD composite map and the AiDepth+MSD composite map generated by the map composition unit 34 are supplied to the focus target determination unit 35.

The focus target determination unit 35 determines a focus target on the basis of either the ToF+MSD composite map or the AiDepth+MSD composite map. For example, the focus target determination unit 35 selects one of the ToF+MSD composite map and the AiDepth+MSD composite map as a map to be used for determining the focus target in the autofocus control processing on the input image, and determines the focus target using the selected map.

The selection of the map is processing in which the focus target determination unit 35 selects either the ToF map or the AiDepth map as processing target determination Depth information, which is Depth information used to determine the focus target in the autofocus control processing on the input image. That is, when the focus target determination unit 35 selects one of the ToF+MSD composite map and the AiDepth+MSD composite map, the processing target determination Depth information is selected.

Even in a case where the composition information generated by the map composition unit 34 is information other than the map-shaped information, one of the two pieces of composition information is selected in a similar manner. With use of the selected composition information, the focus target is determined by the focus target determination unit 35. Determining the focus target using the composition information corresponds to determining the focus target on the basis of the main subject information and the processing target determination Depth information.

The method of determining the focus target on the basis of the main subject information and the processing target determination Depth information is not limited to the above-described method. For example, a method of selecting a subject having the highest degree of main subject as a focus target on the basis of the main subject information from among subjects selected on the basis of the processing target determination Depth information may be used.

The focus target determination unit 35 determines a subject corresponding to a region having a predetermined value as a focus target on the basis of the selected map. For example, a subject corresponding to a region having a value equal to or greater than a threshold in the selected map is determined as a focus target. The subject corresponding to the region indicates a subject appearing in the region.

Information regarding the focus target determined by the focus target determination unit 35 is supplied to the lens drive control unit 36.

The lens drive control unit 36 drives the lens drive driver 14 to perform autofocus control so as to focus on the focus target indicated by the information output from the focus target determination unit 35.

<3. Selection of Processing Target Determination Depth Information>

Here, selection conditions of the processing target determination Depth information will be described. Hereinafter, conditions in a case where the focus target determination unit 35 selects the map-shaped information as the processing target determination Depth information will be described. However, each condition can also be applied to selection of the processing target determination Depth information in a case where the composition information generated by the map composition unit 34 is information other than the map-shaped information.

Selection of Processing Target Determination Depth Information Based on Reliability of AiDepth Map For example, the focus target determination unit 35 selects processing target determination Depth information on the basis of the reliability of the AiDepth map. For example, the processing target determination Depth information is determined on the basis of a comparison result between the reliability of the AiDepth information and a threshold. The reliability of the AiDepth map is an index of the certainty of the distance indicated by the AiDepth map. In other words, the reliability of the AiDepth map is an index indicating whether the input image is a good image or a poor image for the inference model for distance inference with respect to inferring the distance to the subject. Depending on how the subject is imaged, there are an image that is good at inferring the distance using the inference model and an image that is not good at inferring the distance using the inference model.

There are various methods for calculating the reliability of the AiDepth map. Depending on the calculation method, the more likely the distance to the subject indicated by the AiDepth map is, the higher the reliability is.

For example, when the reliability of the AiDepth map is higher than a threshold, the focus target determination unit 35 determines a focus target using the AiDepth+MSD composite map composited with the AiDepth map. At this time, the focus target determination unit 35 selects the AiDepth map as the processing target determination Depth information.

On the other hand, when the reliability of the AiDepth map is lower than the threshold, the focus target determination unit 35 determines the focus target using the ToF+MSD composite map composited with the ToF map. At this time, the focus target determination unit 35 selects the ToF map as the processing target determination Depth information.

The reliability of the AiDepth map is, for example, a value based on an output when an input image is input to an inference model for reliability inference that infers the reliability of the AiDepth map. An inference model for reliability inference generated in advance by machine learning using a plurality of images in which the reliability of the AiDepth map is set is prepared in the imaging device 1.

During learning of the inference model for reliability inference, the reliability of the AiDepth map is determined on the basis of, for example, a difference between an AiDepth map generated when a certain image is input to the inference model for distance inference and a correct Depth map of the same image. The reliability of the AiDepth map may be, for example, a value calculated on the basis of a value obtained by comparing values of corresponding pixels of two maps for each pixel and averaging absolute values of errors.

The correct Depth map may be, for example, an AiDepth map generated using an inference model for distance inference that requires a larger number of parameters and operations than the inference model for distance inference prepared in the imaging device 1. An AiDepth map in which the distance to the subject at the position corresponding to each pixel is set as the value of each pixel based on the output when the image in the inference model for distance inference using such an enormous number of parameters is input is used as the correct Depth map. The correct Depth map may be, for example, a Depth map based on the output of the distance sensor.

Instead of using the calculated reliability of the AiDepth map to select the processing target determination Depth information, a value serving as an index of the reliability of the AiDepth map may be used to select the processing target determination Depth information.

Selecting the processing target determination Depth information on the basis of the value serving as the index of the reliability of the AiDepth map corresponds to selecting the processing target determination Depth information on the basis of the reliability of the AiDepth map. Furthermore, selecting the processing target determination Depth information on the basis of the comparison result between the value serving as the index of the reliability of the AiDepth map and the threshold corresponds to selecting the processing target determination Depth information on the basis of the comparison result between the reliability of the AiDepth map and the threshold.

The value serving as an index of the reliability of the AiDepth map may be, for example, a value obtained by averaging absolute values of errors between an AiDepth map generated when a certain image is input to the inference model for distance inference and the correct Depth map of the same image. A value obtained by averaging the absolute values of the errors is lower than the threshold corresponds to a case where the reliability of the AiDepth map is higher than the threshold, and a value obtained by averaging the absolute values of the errors is higher than the threshold corresponds to a case where the reliability of the AiDepth map is lower than the threshold.

In this manner, various values indicating the degree of reliability of the AiDepth map can be used to select the processing target determination Depth information.

For example, even in a case where the AiDepth map generation unit 33 outputs Depth information other than the map-shaped information, the focus target determination unit 35 can select processing target determination Depth information on the basis of the reliability of the Depth information output by the AiDepth map generation unit 33. The reliability of the Depth information output by the AiDepth map generation unit 33 is generated using, for example, the inference model for reliability inference as described above.

In this manner, the processing target determination Depth information is selected on the basis of the reliability of the Depth information output by the AiDepth map generation unit 33. Therefore, in a case where the Depth information output by the AiDepth map generation unit 33 is likely to be reliable, the Depth information output by the AiDepth map generation unit 33 can be selected as processing target determination Depth information, thereby making it possible to determine an appropriate subject as a focus target on the basis of such probable information.

The focus target determination unit 35 is an example of a processing target determination unit. The processing target determination unit determines a processing target in predetermined processing on the input image. The focus target determination unit 35 is an example in which, among the processing target determination units, predetermined processing is set as the autofocus control processing and a processing target is set as a focus target.

Selection of Processing Target Determination Depth Information Based on Reliability of ToF Map For example, the focus target determination unit 35 selects the processing target determination Depth information on the basis of the reliability of the ToF map. For example, the processing target determination Depth information is determined on the basis of a comparison result between the reliability of the ToF information and a threshold. The reliability of the ToF map is an index of the certainty of the distance indicated by the ToF map.

There are various methods for calculating the reliability of the ToF map. Depending on the calculation method, as the distance to the subject indicated by the ToF map is more likely, higher reliability is required.

For example, when the reliability of the ToF map is higher than a threshold, the focus target determination unit 35 determines the focus target using the ToF+MSD composite map composited with the ToF map. At this time, the focus target determination unit 35 selects the ToF map as the processing target determination Depth information.

On the other hand, when the reliability of the ToF map is lower than the threshold, the focus target determination unit 35 determines the focus target using the AiDepth+MSD composite map composited with the AiDepth map. At this time, the focus target determination unit 35 selects the AiDepth map as the processing target determination Depth information.

The reliability of the ToF map is calculated, for example, on the basis of a ratio (error rate) of the pixels in error to all the pixels on the ToF map. The erroneous pixel is, for example, a pixel having no value or having a value of 0 as distance information. Distance information such as a pixel whose luminance is higher than a threshold and a pixel whose luminance is lower than the threshold is an error. For example, the higher the error rate, the lower the reliability of the ToF map.

For example, even in a case where the ToF map generation unit 31 outputs Depth information other than the map-shaped information, the focus target determination unit 35 can select processing target determination Depth information on the basis of the reliability of the Depth information output by the ToF map generation unit 31.

In this manner, the processing target determination Depth information is selected on the basis of the reliability of the Depth information output by the ToF map generation unit 31. Therefore, in a case where the Depth information output by the ToF map generation unit 31 is likely to be reliable, the Depth information output by the ToF map generation unit 31 can be selected as processing target determination Depth information, thereby making it possible to determine an appropriate subject as a focus target on the basis of such probable information.

The reliability of the Depth information output by the ToF map generation unit 31 or the AiDepth map generation unit 33 may be generated, for example, by the ToF map generation unit 31 or the AiDepth map generation unit 33 for which the Depth information has been generated, or may be generated by a reliability determination unit (not illustrated in FIG. 3) included in the control unit 11 different from the ToF map generation unit 31 or the AiDepth map generation unit 33.

The reliability of the Depth information is input to the map composition unit 34 in association with the Depth information, for example. Furthermore, the reliability of the Depth information is input from the map composition unit 34 to the focus target determination unit 35 in association with the composition information generated by the composition processing of the Depth information and the main subject information. The reliability of the Depth information may be directly input to the focus target determination unit 35 from a configuration for generating the reliability of the Depth information without passing through the map composition unit 34, for example.

Selection of Processing Target Determination Depth Information Based on Brightness of Subject Included in Input Image For example, the focus target determination unit 35 selects processing target determination Depth information on the basis of the brightness of the subject included in the input image. When the value indicating the brightness of the subject included in the input image decreases, the accuracy of the AiDepth map decreases.

Therefore, for example, in a case where the value indicating the brightness of the subject included in the input image is equal to or greater than the threshold, the focus target determination unit 35 determines the focus target using the AiDepth+MSD composite map composited with the AiDepth map. At this time, the focus target determination unit 35 selects the AiDepth map as the processing target determination Depth information.

On the other hand, for example, in a case where the value indicating the brightness of the subject included in the input image is lower than the threshold, the focus target determination unit 35 determines the focus target using the ToF+ MSD composite map composited with the ToF map. At this time, the focus target determination unit 35 selects the ToF map as the processing target determination Depth information.

The brightness of the subject included in the input image may be detected using an illuminance sensor (not illustrated in FIG. 2) included in the imaging device 1, or may be detected using the brightness of the input image. The brightness of the input image is specified on the basis of the luminance of each pixel or the like.

In this manner, the processing target determination Depth information is selected on the basis of the brightness of the subject included in the input image. Therefore, in a case where the accuracy of the Depth information output by the AiDepth map generation unit 33 becomes low, the Depth information output by the ToF map generation unit 31 can be selected, thereby making it possible to determine an appropriate subject as a focus target on the basis of such highly accurate information.

Selection of Processing Target Determination Depth Information Based on Other Information For example, the focus target determination unit 35 selects processing target determination Depth information on the basis of an imaging mode when an input image is captured. At the time of capturing the input image, a predetermined imaging mode is set according to various situations such as brightness of the subject.

As described above, when the value indicating the brightness of the subject included in the input image decreases, the accuracy of the AiDepth map decreases. Therefore, when the imaging mode when the input image is captured is a predetermined imaging mode set in a case where the value indicating the brightness of the subject included in the input image is low, the focus target determination unit 35 determines the focus target using the ToF+MSD composite map composited with the ToF map. At this time, the focus target determination unit 35 selects the ToF map as the processing target determination Depth information.

On the other hand, when the imaging mode when the input image is captured is not the predetermined imaging mode set when the value indicating the brightness of the subject included in the input image is low (a time of the imaging mode set in a case where the value indicating the brightness of the subject is high), the focus target determination unit 35 determines the focus target using the AiDepth+MSD composite map composited with the AiDepth map. At this time, the focus target determination unit 35 selects the AiDepth map as the processing target determination Depth information.

Examples of the predetermined imaging mode set when the value indicating the brightness of the subject included in the input image is low include, for example, a night scene mode, a dark place mode, and a night mode.

In this manner, the processing target determination Depth information is selected on the basis of the imaging mode when the input image is imaged. Therefore, in a case where the accuracy of the Depth information output by the AiDepth map generation unit 33 becomes low, the Depth information output by the ToF map generation unit 31 can be selected, thereby making it possible to determine an appropriate subject as a focus target on the basis of such highly accurate information.

The processing target determination Depth information may be selected by using the above conditions in combination. That is, the selection of the processing target determination Depth information can be performed on the basis of at least one of the reliability of the AiDepth map, the reliability of the ToF map, the brightness of the subject, and the imaging mode.

<4. Operation of Imaging Device>

Autofocus control processing of the imaging device 1 will be described with reference to a flowchart of FIG. 4.

In Step S1, the control unit 11 acquires an input image. In the present embodiment, the input image is a preview image obtained by imaging by the imaging device 1. Acquisition of the input image by the control unit 11 is synonymous with reception of image data output by the image sensor 13 by the control unit 11.

In Step S2, the ToF map generation unit 31 generates a ToF map on the basis of sensor data indicating a measurement result by the ToF sensor.

In Step S3, the MSD map generation unit 32 generates the MSD map on the basis of the input image.

In Step S4, the AiDepth map generation unit 33 generates an AiDepth map on the basis of the input image.

Figure 4:
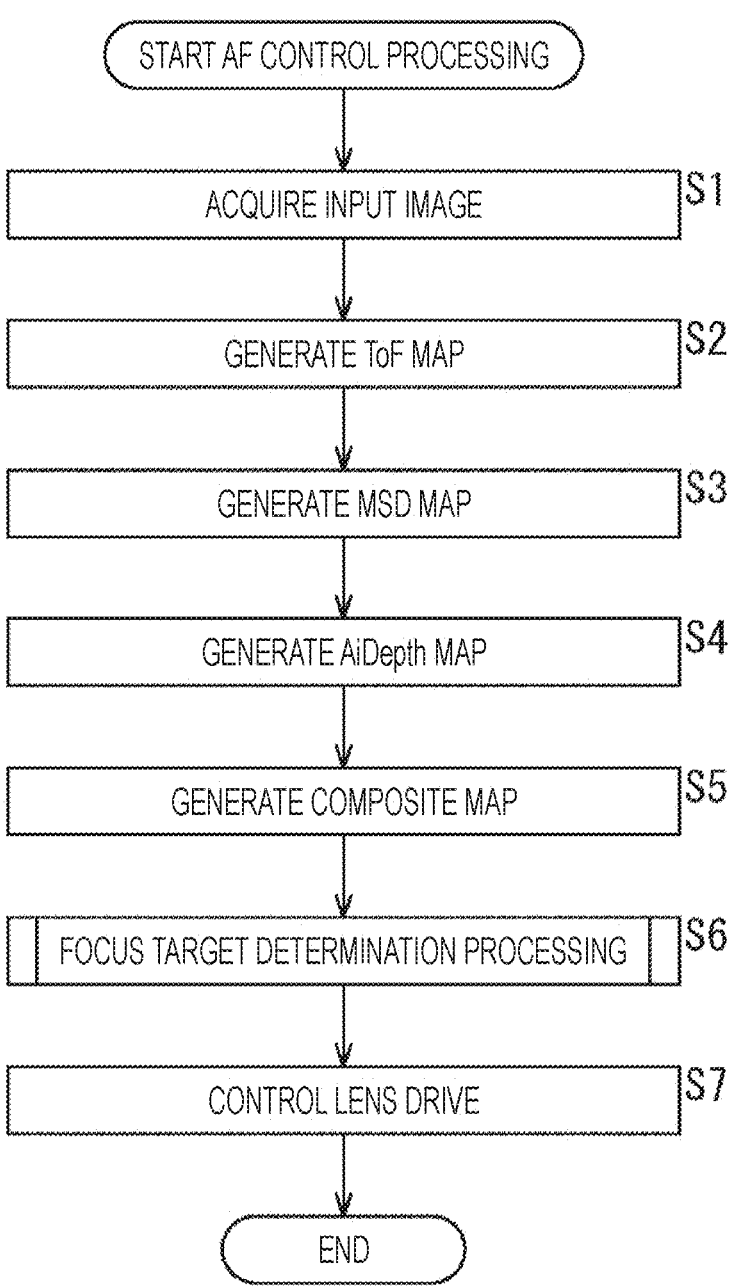
FIG. 4 is a flowchart illustrating autofocus control processing of the imaging device.

The processing in Steps S2 to S4 may be performed not only in the order illustrated in FIG. 4 but also in any order. Furthermore, the processing of Steps S2 to S4 may be performed simultaneously.

In Step S5, the map composition unit 34 generates a ToF+MSD composite map by composition processing of the ToF map and the MSD map, and generates an AiDepth+ MSD composite map by composition processing of the AiDepth map and the MSD map.

In Step S6, the focus target determination unit 35 performs focus target determination processing. The focus target determination processing will be described later with reference to a flowchart of FIG. 5.

In Step S7, the lens drive control unit 36 drives the lens drive driver 14 on the basis of the focus target indicated by the information output from the focus target determination unit 35, thereby performing autofocus control to focus on the focus target. The above processing is repeatedly performed, for example, every time an input image is acquired.

Through the above processing, the imaging device 1 can perform autofocus control processing with an appropriate subject as a focus target.

Figure 5:
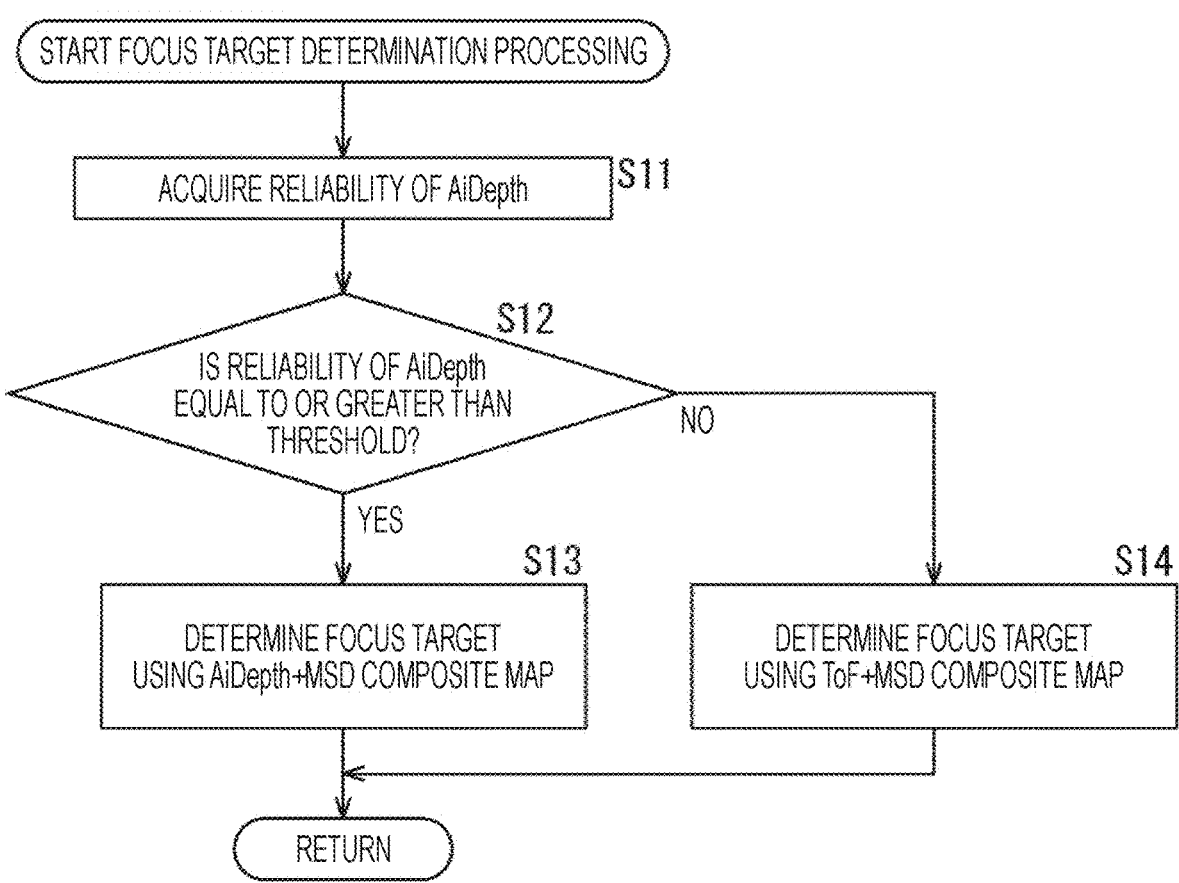
FIG. 5 is a flowchart illustrating focus target determination processing of the imaging device.

The focus target determination processing performed in Step S6 of FIG. 4 will be described with reference to the flowchart of FIG. 5.

In Step S11, the focus target determination unit 35 acquires the reliability of the AiDepth map. Acquisition of the reliability of the AiDepth map by the focus target determination unit 35 is synonymous with reception of the information indicating the reliability of the AiDepth map output from the AiDepth map generation unit 33 by the focus target determination unit 35. Receiving the information indicating the reliability of the AiDepth map output from the AiDepth map generation unit 33 by the focus target determination unit 35 includes not only directly receiving the information indicating the reliability of the AiDepth map from the AiDepth map generation unit 33 but also receiving the information through the map composition unit 34.

In Step S12, the focus target determination unit 35 determines whether or not the reliability of the AiDepth map is equal to or greater than a threshold.

In a case where it is determined in Step S12 that the reliability of the AiDepth map is equal to or greater than the threshold, the focus target determination unit 35 determines the focus target using the AiDepth+MSD composite map in Step S13. That is, the focus target determination unit 35 selects the AiDepth map as the processing target determination Depth information, and determines the focus target on the basis of the AiDepth map and the MSD map. The focus target determination unit 35 determines a subject corresponding to a region having a value equal to or greater than a threshold in the AiDepth+MSD composite map as a focus target.

On the other hand, in a case where it is determined in Step S12 that the reliability of the AiDepth map is not equal to or greater than the threshold, the focus target determination unit 35 determines the focus target using the ToF+MSD composite map in Step S14. That is, the focus target determination unit 35 selects the ToF map as the processing target determination Depth information, and determines the focus target on the basis of the ToF map and the MSD map. The focus target determination unit 35 determines a subject corresponding to a region having a value equal to or greater than the threshold in the ToF+MSD composite map as a focus target.

Through the above processing, the focus target in the input image is determined. After the focus target is determined in Step S13 or S14, the processing returns to Step S6 in FIG. 4, and the subsequent processing is performed.

<5. First Modification of Focus Target Determination Processing>

Figure 6:
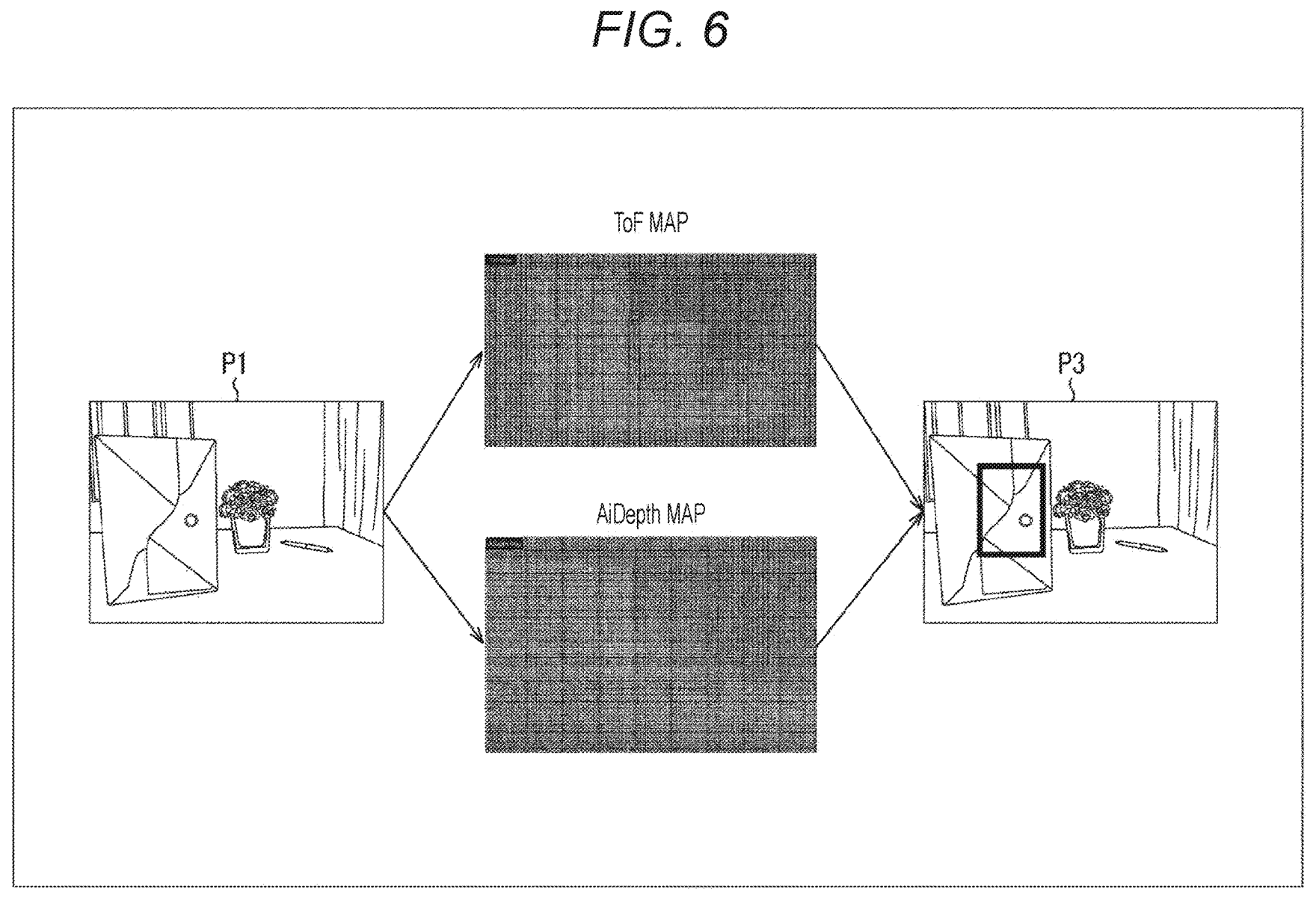

FIG. 6 is a diagram illustrating another example of the focus target determination processing in the imaging device 1 according to the embodiment of the present technology. Duplicated description of the above description will be omitted as appropriate. The same applies to other drawings described later.

An input image P1 used in the focus target determination processing is the same image as the input image P1 described with reference to FIG. 1. Note that the input image P1 illustrated at a left end in FIG. 1 and an input image P3 illustrated at a right end are the same image including the same subject. For convenience of description, different numbers are assigned to the input image P1 and the input image P3.

In the example of FIG. 6, a focus target is determined on the basis of Depth information selected from two pieces of Depth information. That is, processing such as map composition is not performed.

As illustrated in FIG. 6, a ToF map and an AiDepth map are generated corresponding to the input image P1.

Subsequently, either the ToF map or the AiDepth map is selected as a processing target determination Depth information.

As described above with reference to FIG. 3, the processing target determination Depth information is selected on the basis of, for example, at least one of reliability of the AiDepth map or the ToF map, brightness of a subject appearing in the input image P1, or an imaging mode of the imaging device 1.

Then, with use of the Depth map selected as the processing target determination Depth information out of the ToF map and the AiDepth map, the subject O2 closer in distance than the subject O1 is determined as a focus target as indicated by a thick line on an input image P3.

In the example of FIG. 6, the focus target is determined by a short-distance priority algorithm using the Depth map selected from the ToF map and the AiDepth map. In addition to the short-distance priority algorithm, for example, the focus target may be determined using an algorithm that determines a subject at a predetermined distance as the focus target.

In the imaging device 1, focus control for focusing on the subject O2 is performed.

In this manner, the focus target is determined using the processing target determination Depth information selected from the two pieces of Depth information on the basis of various conditions. This makes it possible to select more accurate or more probable Depth information from the two pieces of Depth information. An appropriate subject can be determined as a focus target on the basis of such highly accurate or probable information.

<6. Second Modification of Focus Target Determination Processing>

Figure 7:
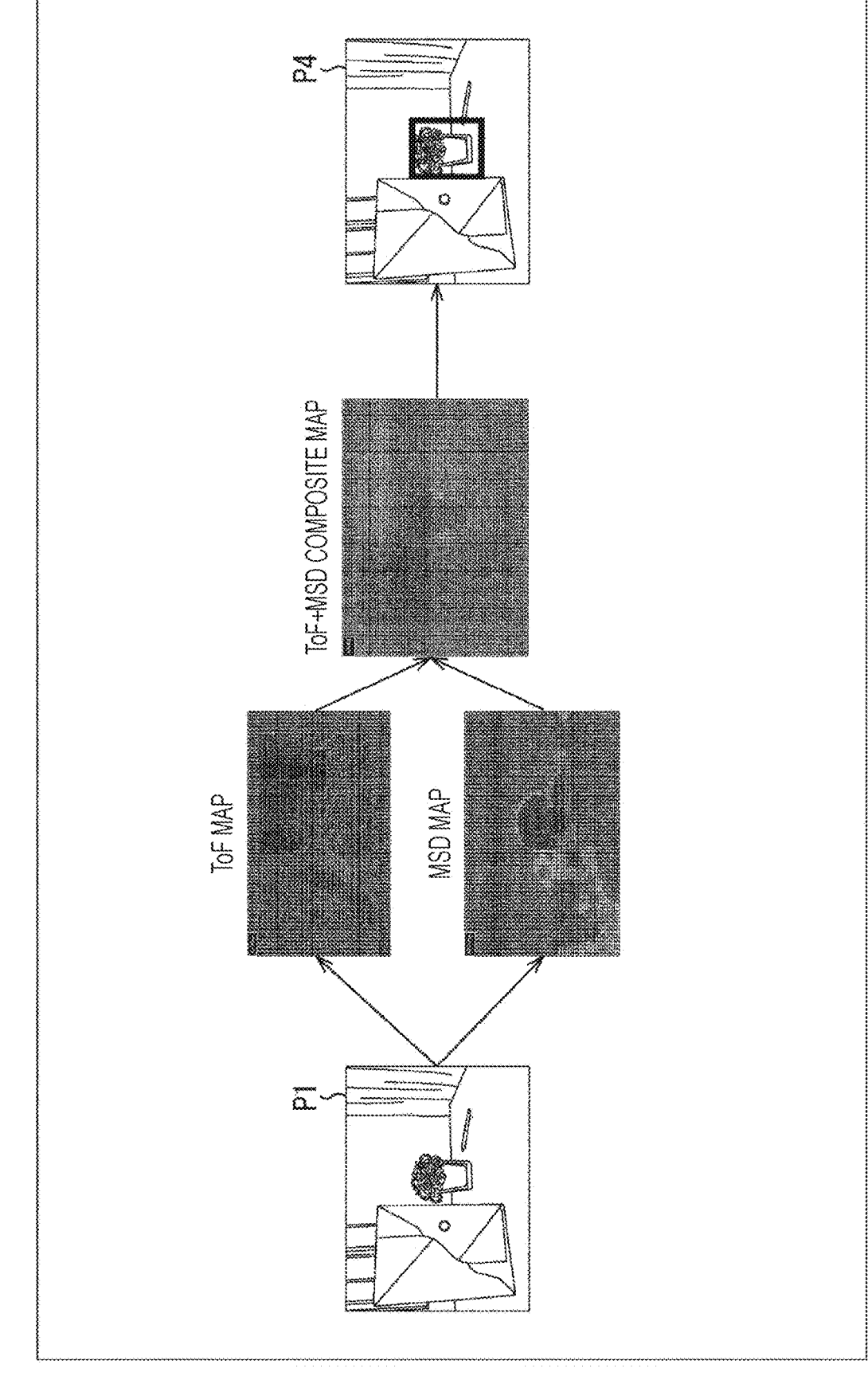
FIG. 7 is a diagram illustrating a second modification of the focus target determination processing.

FIG. 7 is a diagram illustrating another example of the focus target determination processing in the imaging device 1 according to the embodiment of the present technology.

An input image P1 used in the focus target determination processing is the same image as the input image P1 described with reference to FIG. 1. Note that an input image P1 illustrated at the left end in FIG. 1 and an input image P4 illustrated at a right end are the same image including the same subject. For convenience of description, different numbers are assigned to the input image P1 and the input image P4.

In the example of FIG. 7, a focus target is determined on the basis of Depth information and main subject information. That is, processing of selecting one piece of Depth information from two pieces of Depth information is not performed.

As illustrated in FIG. 7, a ToF map and an MSD map are generated corresponding to the input image P1.

Subsequently, a ToF+MSD composite map is generated by composition processing of the ToF map and the MSD map.

Then, with use of the ToF+MSD composite map, as illustrated by being surrounded by a thick line on the input image P4, a subject O1 appearing in a region having a higher value than a subject O2 in the ToF+MSD composite map is determined as the focus target.

In the imaging device 1, focus control for focusing on the subject O1 is performed.

On the other hand, when the focus target is determined using the composite map as illustrated in FIG. 7, the focus target is determined using both the information on the distance to the subject and the information on the main subject degree of the subject. The focus target using both the information on the distance to the subject and the information on the main subject degree of the subject is determined, a more appropriate subject can be determined in consideration of the type, size, position in the image, and the like of the subject as the focus target.

<7. Third Modification of Focus Target Determination Processing>

Figure 8:
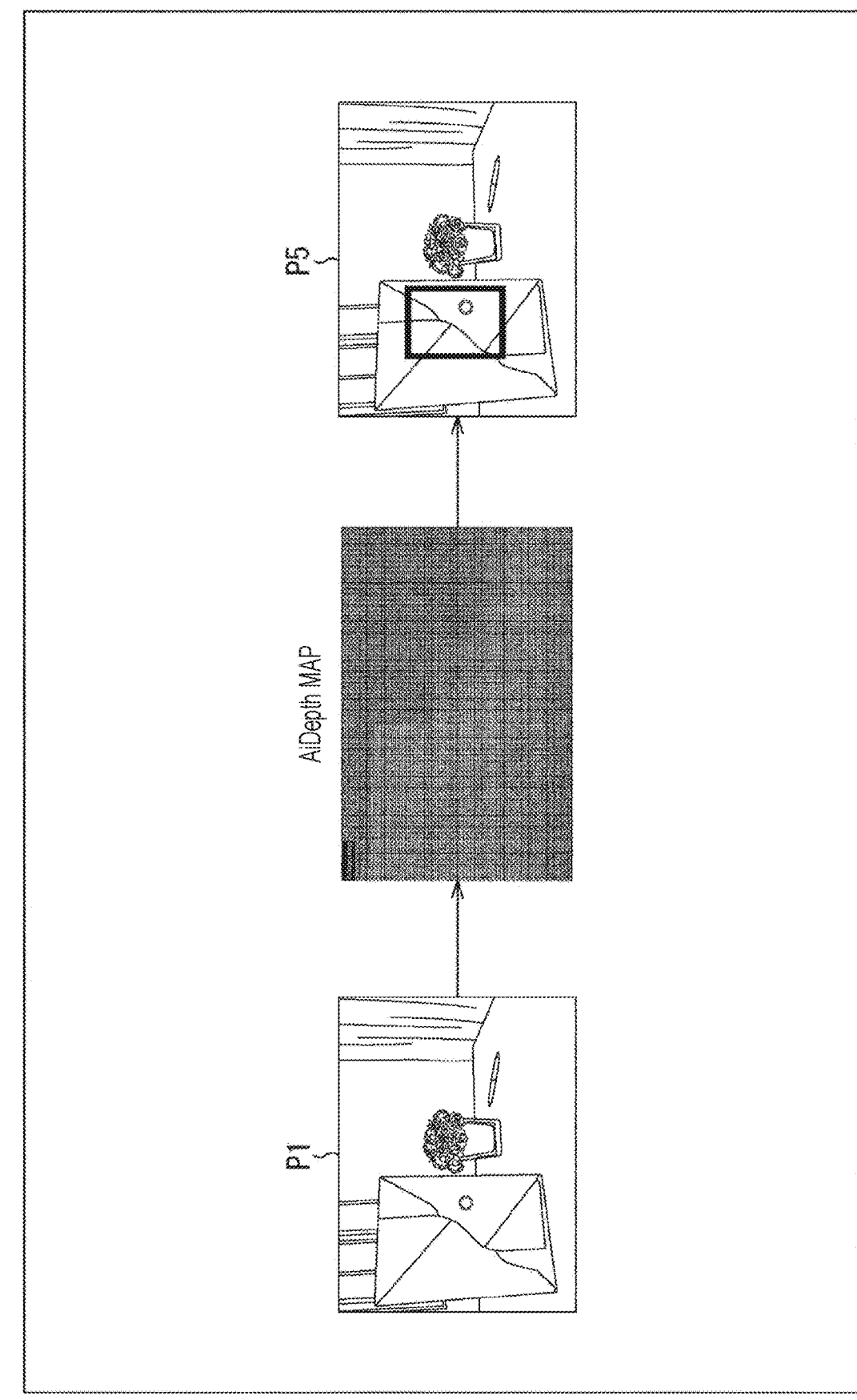
FIG. 8 is a diagram illustrating a third modification of the focus target determination processing.

FIG. 8 is a diagram illustrating another example of the focus target determination processing in the imaging device 1 according to the embodiment of the present technology.

An input image P1 used in the focus target determination processing is the same image as the input image P1 described with reference to FIG. 1. Note that an input image P1 illustrated at the left end in FIG. 1 and an input image P5 illustrated at a right end are the same image including the same subject. For convenience of description, different numbers are assigned to the input image P1 and the input image P5.

In the example of FIG. 8, a focus target is determined using the Depth information based on the output when the input image P1 is input to the inference model for distance inference. That is, map composition, processing of selecting one piece of Depth information from two pieces of Depth information, and the like are not performed.

As illustrated in FIG. 8, the AiDepth map is generated corresponding to the input image P1.

Subsequently, as indicated by a thick line on the input image P5 by using the AiDepth map, the subject O2 closer in distance than the subject O1 is determined as the focus target.

In the example of FIG. 8, the AiDepth map is used to determine the focus target by a short-distance priority algorithm. In addition to the short-distance priority algorithm, for example, the focus target may be determined using an algorithm that determines a subject at a predetermined distance as the focus target.

In the imaging device 1, focus control for focusing on the subject O2 is performed.

In this manner, the focus target is determined using the Depth information based on the output when the input image is input to the inference model for distance inference. As a result, even in a case where the distance sensor is not provided in the imaging device 1, an appropriate subject can be determined as a focus target.

<8. Tracking Target Determination Processing>

The present technology is applicable not only to autofocus control processing but also to tracking control processing. The tracking target determination processing is performed by appropriately determining a tracking target, which is a subject to be tracked, from among subjects included in the input image using the input image or the like. Angle of view control is performed on the basis of the determined tracking target.

Configuration of Imaging Device

FIG. 9 is a block diagram illustrating a functional configuration example of the control unit 11 of the imaging device 1 in a case where the present technology is applied to tracking control processing.

As illustrated in FIG. 9, the control unit 11 includes a ToF map generation unit 41, an MSD map generation unit 42, an AiDepth map generation unit 43, a map composition unit 44, a tracking target determination unit 45, and an angle of view control unit 46. The ToF map generation unit 41, the MSD map generation unit 42, the AiDepth map generation unit 43, and the map composition unit 44 have configurations having functions similar to those of the ToF map generation unit 31, the MSD map generation unit 32, the AiDepth map generation unit 33, and the map composition unit 34 in FIG. 3, respectively, and thus, description thereof is omitted.

The tracking target determination unit 45 determines a tracking target on the basis of either the ToF+MSD composite map or the AiDepth+MSD composite map. For example, the tracking target determination unit 45 selects one of the ToF+MSD composite map and the AiDepth+MSD composite map, and determines the tracking target using the selected map. The composite map selected by the tracking target determination unit 45 is a map used to determine the tracking target in the tracking control process for the input image.

With use of the conditions similar to those described above for the focus target determination unit 35, the tracking target determination unit 45 can select processing target determination Depth information. The processing target determination Depth information is selected from the ToF map and the AiDepth map on the basis of, for example, any one of the reliability of the AiDepth map or the ToF map, the brightness of the subject included in the input image, and the imaging mode of the imaging device 1.

The tracking target determination unit 45 is an example of a processing target determination unit that sets predetermined processing as tracking control processing and a processing target as a tracking target.

The information regarding the tracking target determined as described above is supplied to the angle of view control unit 46.

The angle of view control unit 46 performs angle of view control such that the tracking target is included in the angle of view by performing PTZ driving or cropping processing on the basis of the tracking target output from the tracking target determination unit 45.

Operation of Imaging Device

Figure 10:
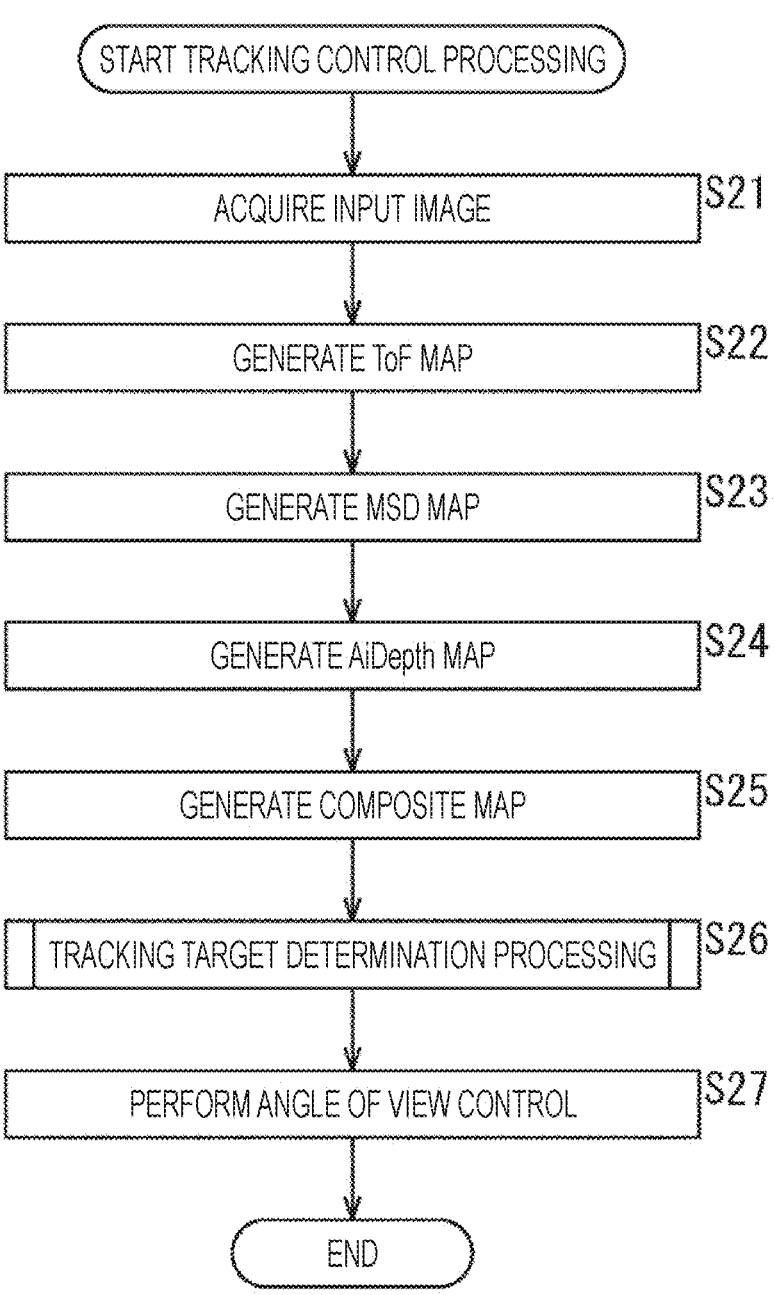
FIG. 10 is a flowchart illustrating tracking control processing of the imaging device.

The tracking control processing of the imaging device 1 will be described with reference to a flowchart of FIG. 10.

The processing in Steps S21 to S25 is similar to the processing in Steps S1 to S5 in FIG. 4, respectively. That is, after a preview image or the like is acquired as the input image, the ToF map, the MSD map, and the AiDepth map are generated. Furthermore, a ToF+MSD composite map is generated by composition processing of the ToF map and the MSD map, and an AiDepth+MSD composite map is generated by composition processing of the AiDepth map and the MSD map.

After the two composite maps are generated, in Step S26, the tracking target determination unit 45 performs tracking target determination processing. The tracking target determination processing is processing of determining a tracking target instead of a focus target by processing similar to the focus target determination processing described with reference to the flowchart of FIG. 5.

In Step S27, the angle of view control unit 46 performs angle of view control such that the tracking target is included in the angle of view by performing PTZ driving or cropping processing on the basis of the tracking target determined by the tracking target determination unit 45. The above processing is repeatedly performed, for example, every time an input image is acquired.

Through the above processing, the imaging device 1 can perform tracking control processing with an appropriate subject as a tracking target.

The tracking target can be determined by using a method similar to the method of determining the focus target described with reference to FIGS. 6 to 8.

<9. Emphasis Target Determination Processing>

The present technology is applicable not only to autofocus control processing but also to background blurring control processing. The background blurring control process is performed such that an emphasis target, which is a subject to be emphasized, is appropriately determined from among subjects included in the input image using the input image or the like. Blurring processing is performed on the basis of the determined emphasis target. The background blurring control processing is processing of performing blurring processing on a region corresponding to the background of the emphasis target to make the emphasis target stand out. That is, it can be said that the emphasis target is a subject not subjected to the blurring process and is a subject emphasized by the background blurring control process.

Configuration of Imaging Device

Figure 12:
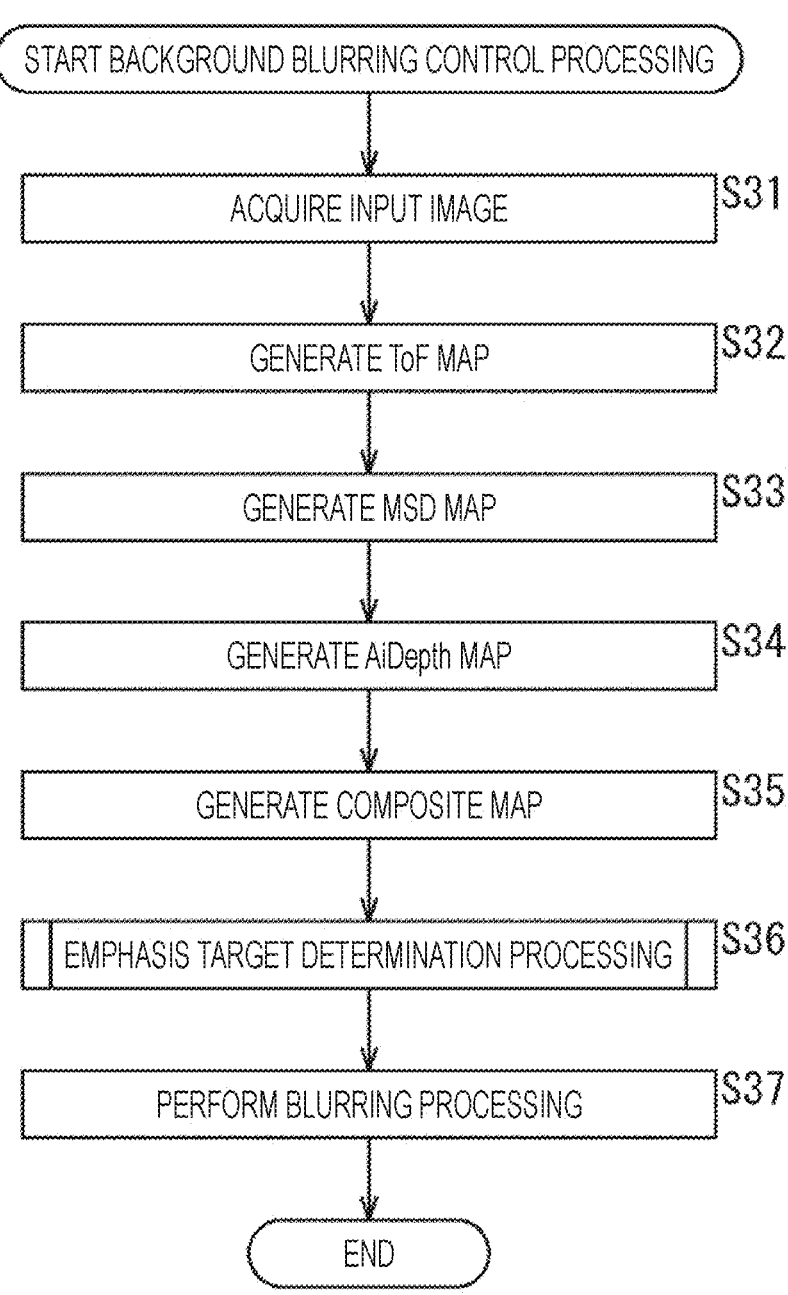
FIG. 12 is a flowchart illustrating the background blurring control processing of the imaging device.

FIG. 12 is a block diagram illustrating a functional configuration example of the control unit 11 of the imaging device 1 in a case where the present technology is applied to the background blurring control processing.

As illustrated in FIG. 12, the control unit 11 includes a ToF map generation unit 51, an MSD map generation unit 52, an AiDepth map generation unit 53, a map composition unit 54, an emphasis target determination unit 55, and an image processing unit 56. The ToF map generation unit 51, the MSD map generation unit 52, the AiDepth map generation unit 53, and the map composition unit 54 have configurations having functions similar to those of the ToF map generation unit 31, the MSD map generation unit 32, the AiDepth map generation unit 33, and the map composition unit 34 in FIG. 3, and thus, description thereof is omitted.

The emphasis target determination unit 55 determines an emphasis target on the basis of either the ToF+MSD composite map or the AiDepth+MSD composite map. For example, the emphasis target determination unit 55 selects one of the ToF+MSD composite map and the AiDepth+MSD composite map as a map to be used for determining an emphasis target in the blur control processing on the input image, and determines the emphasis target using the selected map.

The emphasis target determination unit 55 can select processing target determination Depth information using the conditions similar to those described above in the focus target determination unit 35. The processing target determination Depth information is selected from the ToF map and the AiDepth map on the basis of, for example, any one of the reliability of the AiDepth map or the ToF map, the brightness of the subject included in the input image, and the imaging mode of the imaging device 1.

The emphasis target determination unit 55 is an example of a processing target determination unit that sets predetermined processing as background blurring control processing and sets the processing target as an emphasis target.

Information regarding the emphasis target determined as described above is supplied to the image processing unit 56.

The image processing unit 56 performs blurring processing on the basis of the emphasis target output from the emphasis target determination unit 55. The blurring process is a process of separating an emphasis target region and a background region and blurring the background region.

The region to be emphasized and the background region are separated on the basis of, for example, an image recognition result. At this time, for example, with use of Depth information such as Depth information based on parallax between a plurality of lenses and processing target determination Depth information, the emphasis target region and the background region can be more accurately separated. For example, the emphasis target, the region, and the background region can be separated from each other by using a subject separated from the emphasis target by a distance equal to or longer than a threshold as the background region. For the background region, for example, appearance as a photograph is further improved by changing the blur amount according to a distance to the subject using the Depth information such as the processing target determination Depth information.

Operation of Imaging Device

The imaging processing of the imaging device 1 including the emphasis target determination processing will be described with reference to a flowchart of FIG. 12.

The processing in steps S31 to S35 is similar to the processing in steps S1 to S5 in FIG. 4, respectively. That is, after a preview image or the like is acquired as the input image, the ToF map, the MSD map, and the AiDepth map are generated. Furthermore, a ToF+MSD composite map is generated by composition processing of the ToF map and the MSD map, and an AiDepth+MSD composite map is generated by composition processing of the AiDepth map and the MSD map.

After the two composite maps are generated, in Step S36, the emphasis target determination unit 55 performs emphasis target determination processing. The emphasis target determination processing is processing of determining an emphasis target instead of a focus target by processing similar to the focus target determination processing described with reference to the flowchart of FIG. 5.

In Step S37, blurring processing is performed on the basis of the emphasis target determined by the emphasis target determination unit 55. The blurring process is a process of separating an emphasis target region and a background region and blurring the background region. The above processing is repeatedly performed, for example, every time an input image is acquired.

With the above processing, the imaging device 1 can perform blurring processing with an appropriate subject as an emphasis target.

The emphasis target can be determined by using a method similar to the method of determining the focus target described with reference to FIGS. 6 to 8.

<10. Others>

Figure 11:
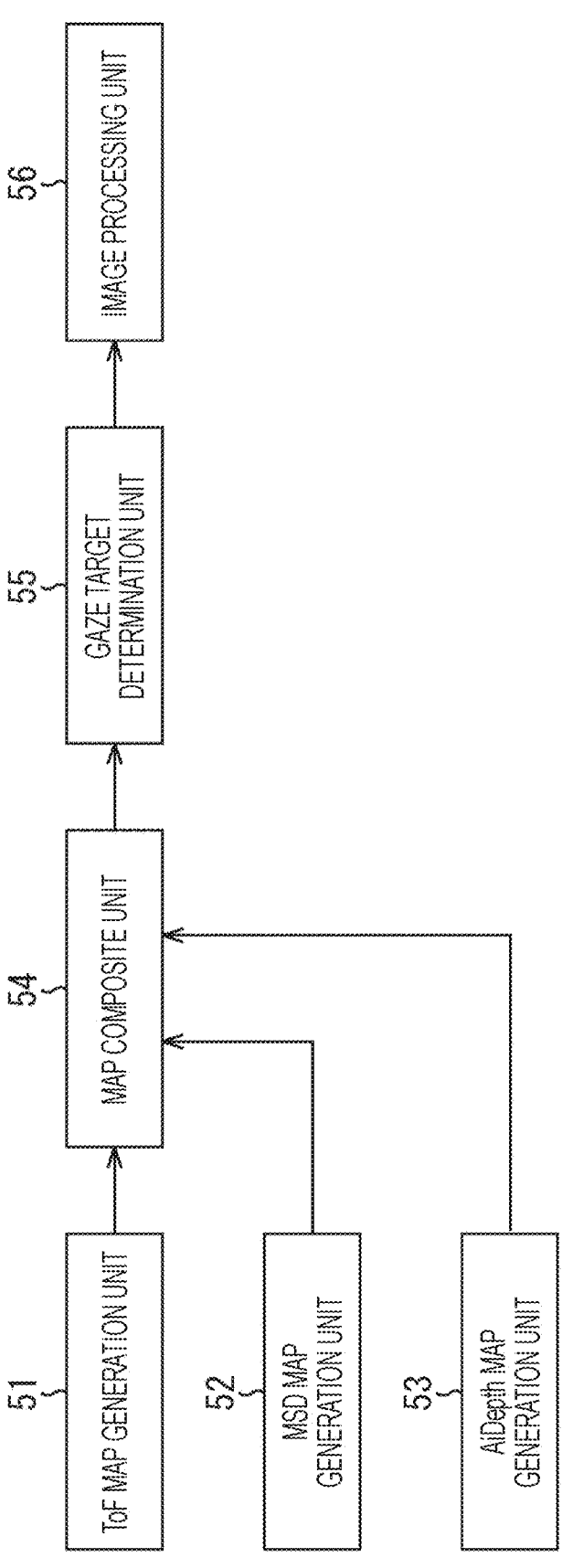
FIG. 11 is a block diagram illustrating a functional configuration example of a control unit in a case where the present technology is applied to background blurring control processing.

The processing of determining the processing target in the above-described predetermined processing including the focus target determination processing may be performed in an external device different from the imaging device 1 that captures the input image. The external device is provided with the same configurations as the configurations of the focus target determination unit 35, the tracking target determination unit 45, the emphasis target determination unit 55, and the like described with reference to FIGS. 3, 9, and 11. Both the imaging device 1 and the external device are information processing devices.

Note that the effects described in the present specification are merely examples and are not limited, and there may be other effects.

Embodiments of the present technology are not limited to the embodiment described above, and various modifications may be made without departing from the gist according to the present technology.

For example, the present technology can have a cloud computing configuration in which one function is shared and processed in cooperation by a plurality of devices through a network.

Furthermore, each step described in the above-described flowcharts can be executed by one device or executed by a plurality of devices in a shared manner.

Moreover, in a case where a plurality of pieces of processing is included in one Step, the plurality of pieces of processing included in the one Step can be executed by one device or executed by a plurality of devices in a shared manner.

<11. Examples of Combinations of Configurations>

The present technology may also have the following configurations.

(1)

An information processing device including:

a processing target determination unit that determines a processing target in predetermined processing on an input image, using processing target determination Depth information selected from first Depth information indicating a distance to a subject included in the input image, the first Depth information being based on an output of a distance sensor, and second Depth information based on an output when the input image is input to an inference model that infers the distance to the subject.

(2)

The information processing device according to (1) described above, in which the processing target determination unit selects the processing target determination Depth information on the basis of reliability of the second Depth information.

(3)

The information processing device according to (2) described above, in which the processing target determination unit selects the processing target determination Depth information on the basis of a comparison result between the reliability of the second Depth information and a threshold.

(4)

The information processing device according to (2) or (3) described above, in which the reliability of the second Depth information is a value based on an output when the input image is input to an inference model that infers reliability of the Depth information.

(5)

The information processing device according to any one of (1) to (4) described above, in which the processing target determination unit selects the processing target determination Depth information on the basis of brightness of a subject included in the input image.

(6)

The information processing device according to (5) described above, in which the processing target determination unit selects the second Depth information as the processing target determination Depth information in a case where a value indicating the brightness of the subject is equal to or greater than a threshold.

(7)

The information processing device according to any one of (1) to (6) described above, in which the processing target determination unit selects the processing target determination Depth information on the basis of reliability of the first Depth information.

(8)

The information processing device according to any one of (1) to (7) described above, in which the processing target determination unit selects the processing target determination Depth information on the basis of an imaging mode when the input image is captured.

(9)

The information processing device according to (8) described above, in which the processing target determination unit selects the first Depth information as the processing target determination Depth information in a case where the imaging mode is any of a dark place mode, a night scene mode, and a night mode.

(10)

The information processing device according to any one of (1) to (9) described above, in which the processing target determination unit determines the processing target on the basis of main subject degree information indicating a main subject degree that is a degree of main subject similarity of a subject included in the input image and the processing target determination Depth information.

(11)

The information processing device according to (10) described above, in which the processing target determination unit determines the processing target on the basis of composition information generated by composition processing of the main subject degree information and the processing target determination Depth information.

(12)

The information processing device according to (10) described above, in which in a case where the main subject degree information is a main subject degree map in which the main subject degree is a pixel value of each pixel, and the processing target determination Depth information is a processing target determination Depth map in which a value indicating a distance to a subject of the input image is a pixel value of each pixel, the processing target determination unit determines the processing target on the basis of a composite map generated by composition processing of the main subject degree map and the processing target determination Depth map.

(13)

The information processing device according to (12) described above, in which the processing target determination unit determines a subject corresponding to a region having a predetermined value in the composite map as the processing target.

(14)

The information processing device according to any one of (1) to (13) described above, in which the predetermined processing is autofocus control processing, and the processing target is a focus target that is a subject to be focused by the autofocus control processing.

(15)

The information processing device according to any one of (1) to (13) described above, in which the predetermined processing is background blurring control processing, and the processing target is an emphasis target that is a subject to be emphasized by the background blurring control processing.

(16)

The information processing device according to any one of (1) to (13) described above, in which the predetermined processing is tracking control processing, and the processing target is a tracking target that is a subject to be tracked in the tracking control processing.

(17)

The information processing device according to any one of (1) to (16) described above, further including an imaging unit that captures the input image.

(18)

The information processing device according to any one of (1) to (17) described above, in which the first Depth information and the second Depth information are both Depth maps in which a value indicating a distance to a subject at a position corresponding to each pixel of the input image is set as a pixel value of each pixel.

(19)

An information processing method including:

determining a processing target in predetermined processing on an input image, using processing target determination Depth information selected from first Depth information indicating a distance to a subject included in the input image, the first Depth information being based on an output of a distance sensor, and second Depth information based on an output when the input image is input to an inference model that infers the distance to the subject by an information processing device.

(20)

A program causing a computer to execute the processing of:

determining a processing target in predetermined processing on an input image, using processing target determination Depth information selected from first Depth information indicating a distance to a subject included in the input image, the first Depth information being based on an output of a distance sensor, and second Depth information based on an output when the input image is input to an inference model that infers the distance to the subject.

REFERENCE SIGNS LIST

1 Imaging device
11 Control unit
31 ToF map generation unit
32 MSD map generation unit
33 AiDepth map generation unit
34 Map composition unit
35 Focus target determination unit
36 Lens drive control unit

The invention claimed is:

1. An information processing device comprising:

a memory storing a program, at least one processor configured to execute the program to perform operations comprising:

determining a processing target in predetermined processing on an input image, using processing target determination depth information selected from first depth information indicating a distance to a subject included in the input image, the first depth information being based on an output of a distance sensor, and second depth information based on an output when the input image is input to an inference model that infers the distance to the subject; and determining the processing target on a basis of main subject degree information indicating a main subject degree that is a degree of main subject similarity of a subject included in the input image and the processing target determination depth information.

2. The information processing device according to claim 1, wherein the operations further comprise:

selecting the processing target determination depth information on a basis of reliability of the second depth information.

3. The information processing device according to claim 2, wherein the operations further comprise:

selecting the processing target determination depth information on a basis of a comparison result between the reliability of the second depth information and a threshold.

4. The information processing device according to claim 2, wherein the reliability of the second depth information is a value based on an output when the input image is input to an inference model that infers reliability of the second depth information.

5. The information processing device according to claim 1, wherein the operations further comprise:

selecting the processing target determination depth information on a basis of brightness of a subject included in the input image.

23

6. The information processing device according to claim 5, wherein the operations further comprise:

selecting the second depth information as the processing target determination depth information in a case where a value indicating the brightness of the subject is equal to or greater than a threshold.

7. The information processing device according to claim 1, wherein the operations further comprise:

selecting the processing target determination depth information on a basis of reliability of the first depth information.

8. The information processing device according to claim 1, wherein the operations further comprise:

selecting the processing target determination depth information on a basis of an imaging mode when the input image is captured.

9. The information processing device according to claim 8, wherein the operations further comprise:

selecting the first depth information as the processing target determination depth information in a case where the imaging mode is any of a dark place mode, a night scene mode, and a night mode.

10. The information processing device according to claim 1, wherein the operations further comprise:

determining the processing target on a basis of composition information generated by composition processing of the main subject degree information and the processing target determination depth information.

11. The information processing device according to claim 1, wherein the operations further comprise:

in a case where the main subject degree information is a main subject degree map in which the main subject degree is a pixel value of each pixel, and the processing target determination depth information is a processing target determination depth map in which a value indicating a distance to a subject of the input image is a pixel value of each pixel, determining the processing target on a basis of a composite map generated by composition processing of the main subject degree map and the processing target determination depth map.

12. The information processing device according to claim 11, wherein the operations further comprise:

determining a subject corresponding to a region having a predetermined value in the composite map as the processing target.

13. An information processing device comprising:

a memory storing a program, at least one processor configured to execute the program to perform operations comprising:

determining a processing target in predetermined processing on an input image, using processing target determination depth information selected from first depth information indicating a distance to a subject included in the input image, the first depth information being based on an output of a distance sensor, and second depth information based on an output when the input image is input to an inference model that infers the distance to the subject, wherein the predetermined processing is autofocus control processing, and the processing target is a focus target that is a subject to be focused by the autofocus control processing.

14. An information processing device comprising:

a memory storing a program, at least one processor configured to execute the program to perform operations comprising:

determining a processing target in predetermined processing on an input image, using processing target determination depth information selected from first depth information indicating a distance to a subject included in the input image, the first depth information being based on an output of a distance sensor, and second depth information based on an output when the input image is input to an inference model that infers the distance to the subject, wherein the predetermined processing is background blurring control processing, and the processing target is an emphasis target that is a subject to be emphasized by the background blurring control processing.

15. An information processing device comprising:

a memory storing a program, at least one processor configured to execute the program to perform operations comprising:

determining a processing target in predetermined processing on an input image, using processing target determination depth information selected from first depth information indicating a distance to a subject included in the input image, the first depth information being based on an output of a distance sensor, and second depth information based on an output when the input image is input to an inference model that infers the distance to the subject, wherein the predetermined processing is a tracking control processing, and the processing target is a tracking target that is a subject to be tracked in the tracking control processing.

16. The information processing device according to claim 1, further comprising an imaging unit that captures the input image.

17. The information processing device according to claim 1, wherein the first depth information and the second depth information are both depth maps in which a value indicating a distance to a subject at a position corresponding to each pixel of the input image is set as a pixel value of each pixel.

18. An information processing method comprising:

determining a processing target in predetermined processing on an input image, using processing target determination depth information selected from first depth information indicating a distance to a subject included in the input image, the first depth information being based on an output of a distance sensor, and second depth information based on an output when the input image is input to an inference model that infers the distance to the subject by an information processing device; and determining the processing target on a basis of main subject degree information indicating a main subject degree that is a degree of main subject similarity of a subject included in the input image and the processing target determination depth information.

19. A non-transitory computer readable medium storing a program, the program being executable by a processor to perform operations comprising:

determining a processing target in predetermined processing on an input image, using processing target determination depth information selected from first depth information indicating a distance to a subject included in the input image, the first depth information being based on an output of a distance sensor, and second depth information based on an output when the input image is input to an inference model that infers the distance to the subject; and determining the processing target on a basis of main subject degree information indicating a main subject degree that is a degree of main subject similarity of a subject included in the input image and the processing target determination depth information.

\* \* \* \* \*